United States Patent
Cunha

(10) Patent No.: US 9,939,154 B2
(45) Date of Patent: Apr. 10, 2018

(54) COMBUSTOR LINERS WITH U-SHAPED COOLING CHANNELS

(71) Applicant: UNITED TECHNOLOGIES CORPORATION, Farmington, CT (US)

(72) Inventor: Frank J. Cunha, Avon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 180 days.

(21) Appl. No.: 14/647,035

(22) PCT Filed: Nov. 6, 2013

(86) PCT No.: PCT/US2013/068728
§ 371 (c)(1),
(2) Date: May 22, 2015

(87) PCT Pub. No.: WO2014/126619
PCT Pub. Date: Aug. 21, 2014

(65) Prior Publication Data
US 2015/0354821 A1    Dec. 10, 2015

Related U.S. Application Data

(60) Provisional application No. 61/764,791, filed on Feb. 14, 2013.

(51) Int. Cl.
*F23R 3/04* (2006.01)
*F23R 3/46* (2006.01)
(Continued)

(52) U.S. Cl.
CPC ............... *F23R 3/04* (2013.01); *F02C 7/18* (2013.01); *F02C 7/185* (2013.01); *F23R 3/002* (2013.01);
(Continued)

(58) Field of Classification Search
CPC .... F23R 3/002; F23R 3/02; F23R 3/04; F23R 3/06; F23R 3/08; F23R 3/42–3/46;
(Continued)

(56) References Cited

U.S. PATENT DOCUMENTS 6,282,905 B1    9/2001    Sato et al.
2004/0003916 A1    1/2004    Nash et al.
(Continued)

FOREIGN PATENT DOCUMENTS

EP    1482246 A1    12/2004
GB    2356042 A    5/2001

OTHER PUBLICATIONS

International Search Report and Written Opinion for related International Application No. PCT/US13/068728; report dated Dec. 18, 2013.
(Continued)

*Primary Examiner* — Gerald L Sung
*Assistant Examiner* — Scott Walthour
(74) *Attorney, Agent, or Firm* — Cantor Colburn LLP

(57) ABSTRACT

A combustor having U-shaped cooling channels is disclosed. The combustor may include a shell having an impingement hole, a liner spaced from the shell and having an effusion hole; a first partition spanning between the shell and the liner, a second partition spaced from the first partition and spanning between the shell and the liner; and a U-shaped channel defined between the shell and the liner and defined in part by the wall, the channel having upstream and downstream ends both adjacent the first partition and separated by the wall, wherein the impingement hole communicates with the upstream end and the effusion hole communicates with the downstream end.

15 Claims, 6 Drawing Sheets

(51) Int. Cl.
| | |
|---|---|
| *F23R 3/52* | (2006.01) |
| *F23R 3/02* | (2006.01) |
| *F02C 7/18* | (2006.01) |
| *F23R 3/56* | (2006.01) |
| *F23R 3/50* | (2006.01) |
| *F23R 3/58* | (2006.01) |
| *F23R 3/00* | (2006.01) |
| *F23R 3/08* | (2006.01) |
| *F23R 3/54* | (2006.01) |
| *F23R 3/44* | (2006.01) |
| *F23R 3/42* | (2006.01) |
| *F23R 3/06* | (2006.01) |

(52) U.S. Cl.
CPC ............... *F23R 3/005* (2013.01); *F23R 3/02* (2013.01); *F23R 3/06* (2013.01); *F23R 3/08* (2013.01); *F23R 3/42* (2013.01); *F23R 3/425* (2013.01); *F23R 3/44* (2013.01); *F23R 3/46* (2013.01); *F23R 3/50* (2013.01); *F23R 3/52* (2013.01); *F23R 3/54* (2013.01); *F23R 3/56* (2013.01); *F23R 3/58* (2013.01); *F05D 2240/35* (2013.01); *F05D 2260/201* (2013.01); *F05D 2260/202* (2013.01); *F05D 2260/2212* (2013.01); *F05D 2260/2214* (2013.01); *F05D 2260/22141* (2013.01); *F23R 2900/03041* (2013.01); *F23R 2900/03042* (2013.01); *F23R 2900/03043* (2013.01); *F23R 2900/03044* (2013.01); *F23R 2900/03045* (2013.01); *Y02T 50/675* (2013.01)

(58) Field of Classification Search
CPC .................................. F23R 3/50–3/58; F23R 2900/03041–2900/03045; F23R 3/005; F02C 7/18; F02C 7/185; Y02T 50/675
See application file for complete search history.

(56) References Cited

U.S. PATENT DOCUMENTS

| | | | |
|---|---|---|---|
| 2006/0056967 A1* | 3/2006 | Liang | F01D 5/186 416/97 R |
| 2007/0028595 A1 | 2/2007 | Mongia et al. | |
| 2007/0125093 A1 | 6/2007 | Burd et al. | |
| 2008/0264065 A1* | 10/2008 | Gerendas | F23R 3/002 60/754 |
| 2008/0271457 A1* | 11/2008 | McMasters | F23R 3/002 60/754 |
| 2009/0120096 A1 | 5/2009 | Tuthill | |
| 2010/0170260 A1* | 7/2010 | Mawatari | F23R 3/005 60/755 |
| 2010/0229564 A1 | 9/2010 | Chila | |
| 2012/0034075 A1 | 2/2012 | Hsu et al. | |
| 2012/0275900 A1 | 11/2012 | Snider et al. | |

OTHER PUBLICATIONS

European Search Report for Application No. EP 13 87 4867.

* cited by examiner

FIG. 3

COMBUSTOR LINERS WITH U-SHAPED COOLING CHANNELS

CROSS-REFERENCE TO RELATED APPLICATION

This Application is a US National Stage under 35 USC § 371 of International Patent Application No. PCT/US13/68728 filed on Nov. 6, 2013, and claims priority under 35 USC § 119(e) to U.S. Provisional Patent Application Ser. No. 61/764,791 filed on Feb. 14, 2013.

FIELD OF THE DISCLOSURE

The present disclosure generally relates to gas turbine engines and, more specifically, to cooling of a combustor of a gas turbine engine.

BACKGROUND OF THE DISCLOSURE

A gas turbine engine, typically used as a source of propulsion in aircraft, operates by drawing in ambient air, mixing and combusting that air with a fuel, and then directing the exhaust from the combustion process out of the engine. A compressor having a low-pressure and high-pressure compressor, rotates to draw in and compress the ambient air. A portion of the compressed air is used to cool a combustor, while the rest is directed into the combustor, mixed with a fuel, and ignited.

Typically, an igniter generates an electrical spark to ignite the air-fuel mixture. The products of the combustion, NOx and CO, then travel out of the combustor as exhaust and through a turbine. The turbine, having a low-pressure and high-pressure turbine, is forced to rotate as the exhaust passes through the turbine blades. The turbine and the compressor are connected by concentrically mounted rotating shafts running through the center of the engine, one shaft for the low-pressure compressor and turbine and one shaft for the high-pressure compressor and turbine. Thus, as the turbine rotates from the exhaust, the compressor rotates to bring in and compress new air. Once started, it can therefore be seen that this process is self-sustaining.

Combustors for gas turbine engines typically have an outer shell and an outer liner, disposed radially inside the outer shell. Additionally, annular combustors have an inner shell and an inner liner radially outside the inner shell. The inner and outer liners are separated by and define a combustion chamber. Flow cavities are typically provided between each pair of shells and liners. Cooling air is forced through these flow cavities and into the combustion chamber, creating a cooling film on hot surfaces of the liners.

Prior art combustion chamber configurations used geometrical profiles that were not convergent in a primary rich zone. Over time, however, such configurations evolved to have a convergent section at the primary rich zone. One of the design intents of such prior art designs was to increase the combustion flow velocity to reduce corresponding combustor residence time. Since time plays a direct part in NOx formation, convergent combustion chamber designs provided an added benefit for NOx. However, aggressive tapering of the convergent combustion chamber section may cause entrainment of cooling flow in the outer recirculation zone. This, in turn, may effect local chemistry as the fuel rich zone trends towards stoichiometric conditions. In this case, flame temperatures increase along with NOx formation.

In light of the foregoing, it can be seen that the gas turbine engine industry continues to strive for designs with reduced NOx emissions, while at the same time increasing engine cooling to thus enhance the serviceable life of the engine.

SUMMARY OF THE DISCLOSURE

In accordance with one aspect of the disclosure, a combustor is disclosed. The combustor may include a shell having an impingement hole, a liner spaced from the shell and having an effusion hole, a first partition spanning between the shell and the liner, a second partition spaced from the first partition, and spanning between the shell and the liner, and a U-shaped channel defined between the shell and the liner and defined in part by the wall, the channel having upstream and downstream ends both adjacent the first partition and separated by the wall, wherein the impingement hole communicates with the upstream end and the effusion hole communicates with the downstream end.

In a refinement, the combustor may further include a third partition spanning between the shell and the liner and connecting the first and second partitions.

In another refinement, the U-shaped channel may include a first flow path extending in a first direction from the impingement hole to a U-turn region, and a second flow path extending in a second direction from the U-turn region to the effusion hole.

In another refinement, a cross-sectional area of the first flow path may decrease from the impingement hole to the U-turn region. Also, a cross-section area of the second flow path may increase from the U-turn region to the effusion hole.

In another refinement, a refresher hole may communicate through at least the shell of the combustor and into the second flow path.

In another refinement, a trip strip may be disposed on the liner in a chevron pattern.

In another refinement, a sloped fin may be disposed on the liner in the first flow path.

In another refinement, the effusion holes may be frusto-conically shaped.

In yet another refinement, a pedestal may be disposed on the liner.

In a further refinement, a U-shaped channel may have a third flow path extending from the U-turn region in the same direction as the second flow path to the effusion hole.

In accordance with another aspect of the disclosure, a gas turbine engine is disclosed. The gas turbine engine may include a compressor, a combustor downstream of the compressor and a turbine downstream of the combustor and connected to the compressor by a rotating shaft. The combustor may include a shell having an impingement hole, a liner disposed inside the shell and having an effusion hole, a first partition spanning between the shell and the liner, a second partition spaced from the first partition and spanning between the shell and the liner, a wall projecting from the first partition, spaced from the second partition and spanning between the shell and the liner, and a U-shaped channel defined between the shell and the liner and defined in part by the wall, the channel having upstream and downstream ends both adjacent the first partition and separated by the wall, wherein the impingement hole communicates with the upstream end and the effusion hole communicates with the downstream end.

In a refinement, the combustor further comprises a third partition spanning between the liner and the shell and connecting the first and second partitions.

In another refinement, the combustor further includes a first flow path extending in a first direction from the impingement hole to a U-turn region, and a second flow path extending in a second direction, different from the first direction, from the U-turn region to the effusion hole.

In a refinement, a cross-sectional area of the first flow path may decrease from the impingement hole to the U-turn region. Also, a cross-section area of the second flow path may increase from the U-turn region to the effusion hole.

In another refinement, a refresher hole may communicate through at least the shell of the combustor and into the second flow path of the U-shaped channel.

In another refinement, a sloped fin may be disposed on the liner.

In accordance with yet another embodiment of the disclosure, a method of cooling a combustor is disclosed. The method may include directing cooling air through an impingement hole in a shell of the combustor into a U-shaped channel between a shell and a liner of the combustor, turning the cooling air in a U-turn from a first flow path of the U-shaped channel to a second flow path of the U-shaped channel, passing the cooling air from the second flow path through an effusion hole in the liner, and creating a cooling film on the liner with the cooling air leaving the effusion hole.

In a refinement, the method may further include increasing turbulence in the U-shaped channel by passing the cooling air over a trip strip disposed on the liner.

In another refinement, the method may further include accelerating the cooling air in the first flow path with an acceleration channel and calming the cooling air in the second flow path with a divergent channel.

In a further refinement, the method may further include admitting cooling air into the second flow path through a refresher hole communicating through at least the shell of the combustor.

These and other aspects and features of the present disclosure will be better understood in light of the following detailed description when read in light of the accompanying drawings.

BRIEF DESCRIPTION OF THE DRAWINGS

FIG. 3 is a sectional view of a combustor constructed in accordance with the present disclosure.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
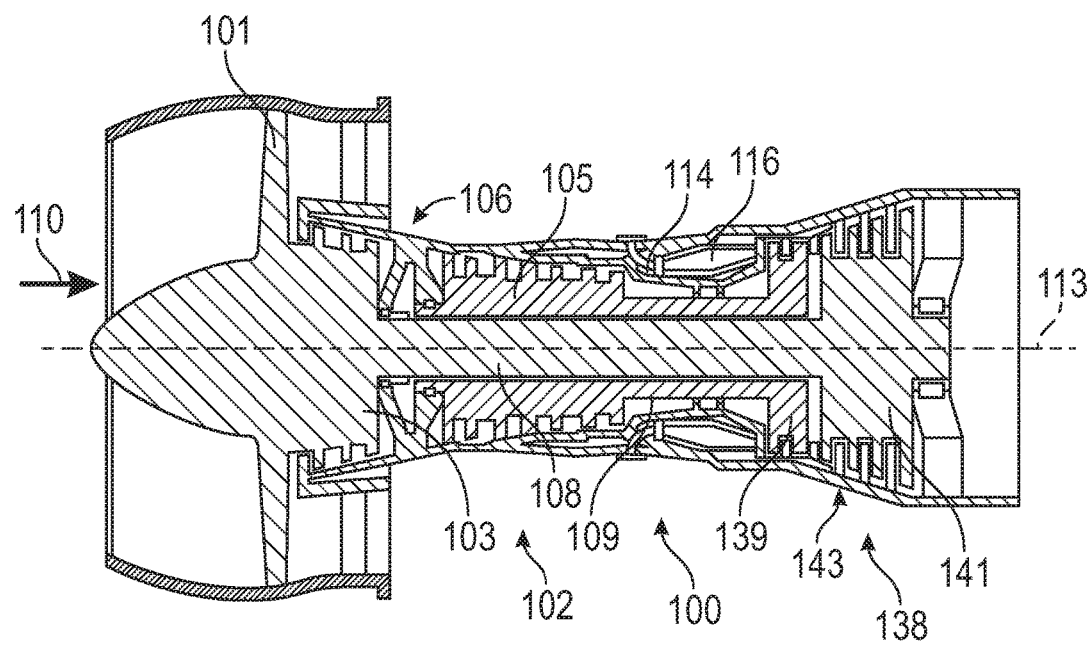
FIG. 1 is a sectional view of a gas turbine engine constructed in accordance with the present disclosure.
Figure 2:
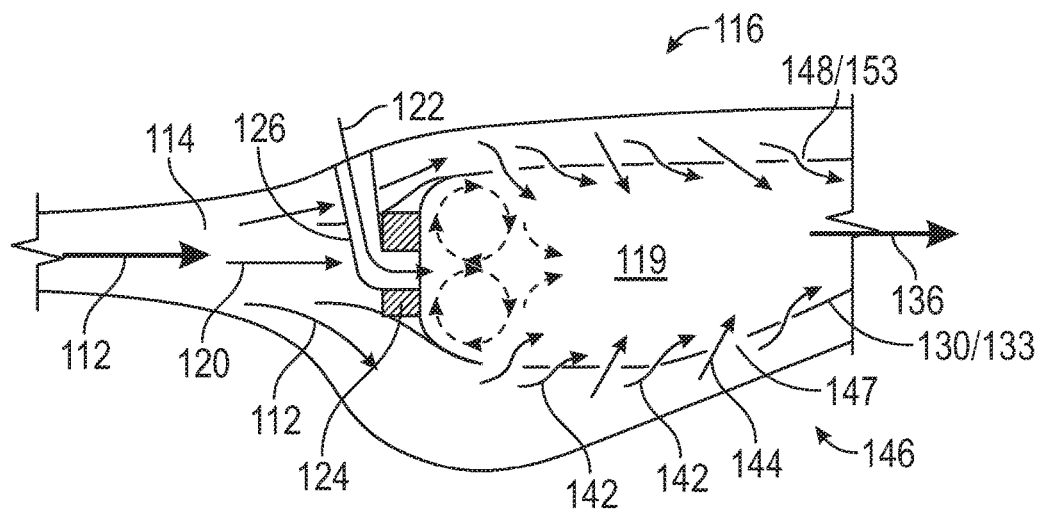
FIG. 2 is a schematic diagram of the air flow of a combustion chamber constructed in accordance with the teachings of this disclosure.

Referring now to the drawings, and with specific reference to FIG. 1, a gas turbine engine, generally referred to by reference numeral 100, is disclosed. The gas turbine engine 100 may have a fan 101 and a compressor section 102 having a low-pressure compressor 103 and a high-pressure compressor 105, positioned at a forward end 106 of the engine 100. The fan 101 and low-pressure compressor 103 may be connected to a first shaft 108 and the high-pressure compressor 105 may be connected to a second shaft 109, where the second shaft 109 is concentrically mounted around the first shaft 108. When the fan 101 rotates, it draws ambient air 110 into the engine 100, and the compressor section 102 compresses same into compressed air 112. The compressed air 112 may pass through and be slowed by a diffuser 114, as shown in FIG. 2, before passing into a combustor 116. At the combustor 116, the compressed air 112 may be split to be used in multiple ways.

Figure 3:
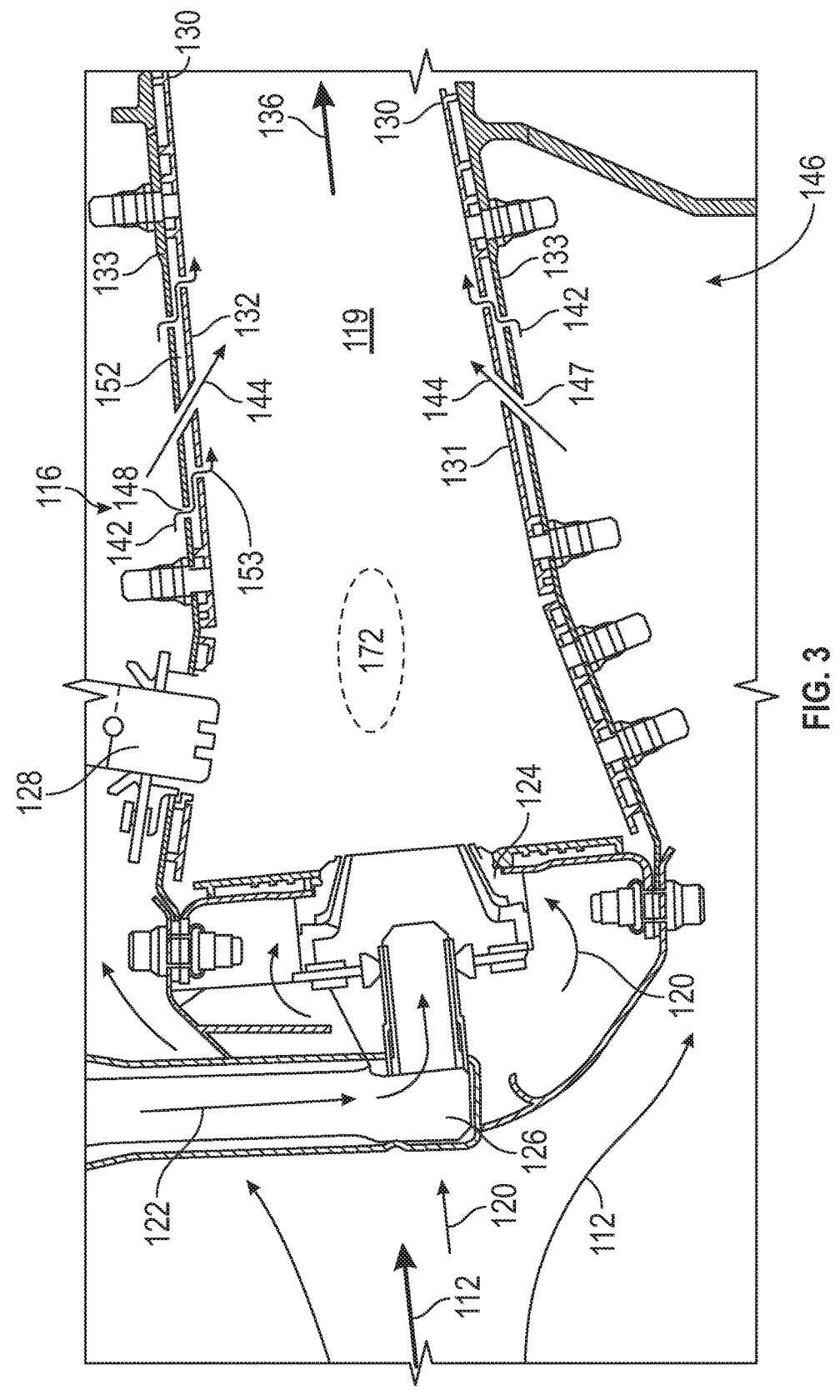

Referring now to FIG. 2 and FIG. 3, at the combustor 116 some of the compressed air 112 may pass through a swirler 124 into a combustion chamber 119 as combustion air 120. The swirler 124 may create turbulence in the combustion air 120 to mix the combustion air 120 with a fuel 122, which may enter the combustion chamber 119 by a fuel injector 126. The air-fuel mixture may then be ignited by an igniter 128 disposed through a liner 130 and a shell 133 of the combustor 116. As will be noted from FIG. 3, the liner 130 is exposed to the combustion chamber 119 on one side and faces the shell 133 on the opposite side. Because the chamber 119 is annular in shape, a radially inner liner 131 and a radially outer liner 132, which are concentric to one another and centered along the engine axis 113, define the combustion chamber 119.

The combustion products may then be ejected from the combustion chamber 119 as exhaust 136 passing through a turbine section 138 as seen in FIG. 1, having a high-pressure turbine 139 and a low-pressure turbine 141, as the exhaust 136 exits the engine 100. The high-pressure turbine 139 may be connected to the second shaft 109 and the low-pressure turbine 141 may be connected to the first shaft 108, both at an aft end 143 of the engine 100. When the turbine section 138 is rotated by the exhaust 136, the shafts 108 and 109 rotate the fan 101 and compressor section 102 about central axis 113. The process may thereby draw in more ambient air 110 as the exhaust 136 exits and may be self-sustaining once it has begun.

The compressed air 112 not used as combustion air 120 entering into the combustion chamber 119 through the swirler 124 may be used as cooling air 142 or dilution air 144. The dilution air 144 may enter the combustion chamber 119 at a back end 146 thereof through one of more air admittance holes 147. The dilution air 144 mixes with the remaining fuel 122 in the combustion chamber 119 for further, more complete, combustion, while also reducing the temperature of the exhaust 136 before the exhaust 136 reaches the turbine 138. While only one or two air admittance holes 147 may be depicted in the drawings, it is to be understood that this is only for ease of illustration, and that a greater or lesser number may be employed.

The cooling air 142, on the other hand, may pass through one or more impingement holes 148 in the combustor shell 133 into a flow cavity 152 as shown in FIG. 3. The flow cavity 152 is the space disposed between, and defined by, the shell 133 and the liner 130. The shell 133 and liner 130 forming the flow cavity 152 may be either an outer or inner shell and liner combination. After passing through the flow cavity 152, the cooling air exits into the combustion chamber 119 through one or more effusion holes 153 as will be described in further detail below.

Figure 4:
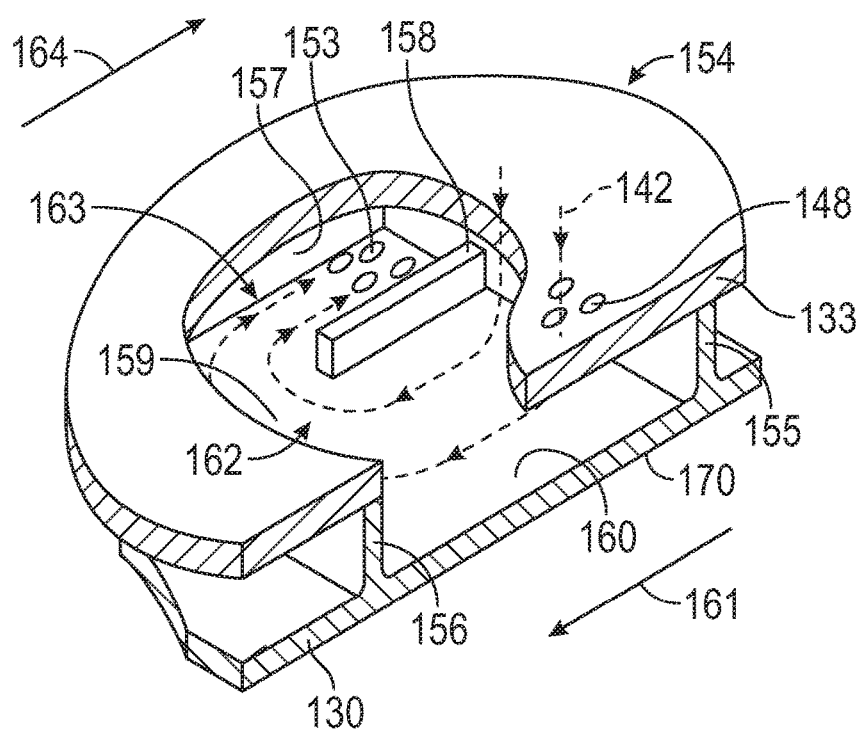
FIG. 4 is a perspective partial cross-sectional view of a U-shaped channel constructed in accordance with a first embodiment of the present disclosure.
Figure 8:
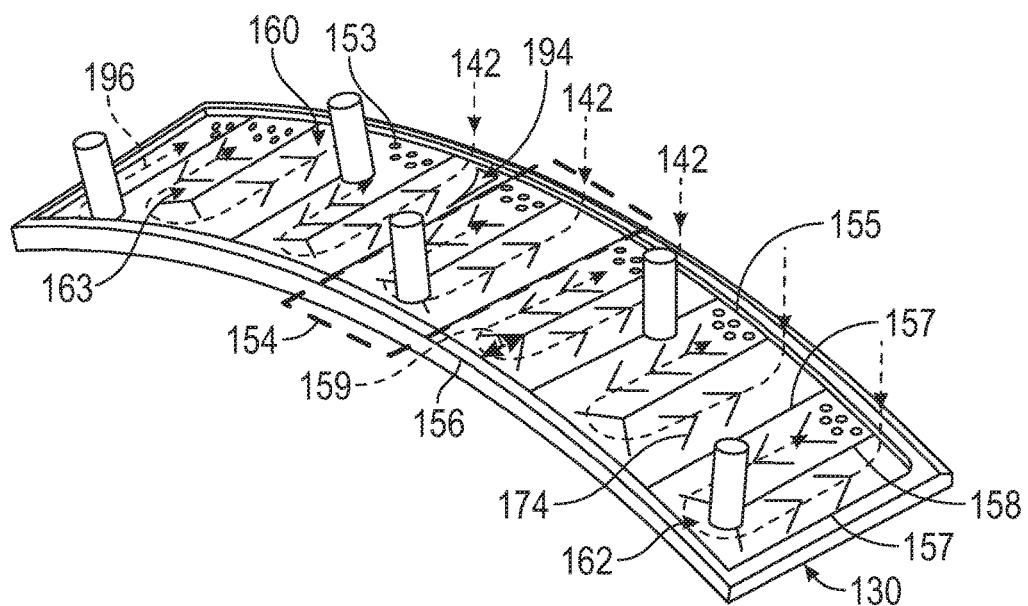
FIG. 8 is a perspective view of a liner panel of a combustor constructed in accordance with a third embodiment of the present disclosure depicting a plurality of U-shaped channels, including one dual divergent channel.

Within the flow cavity 152, one or more U-shaped channels 154, as shown best in FIGS. 4 & 8, are provided. Starting with FIG. 4, it can be seen that a combination of partitions and walls cooperate with the liner 130 and shell 133 to form the U-shaped channel 154. More specifically, a first partition 155 spans between the liner 130 and shell 133, a second partition 156 spans between the liner 130 and shell 133 but spaced from the first partition, and a third partition 157 spans between the liner 130 and shell 133 and connecting the first partition to the second partition 156. The third partition 157 also separates adjacent U-shaped channels 154, as shown best in FIG. 8. A wall 158 projects from the first partition 155 toward the second partition 156, but stops short thereof to define a gap 159 therebetween. While each of the partitions and walls are depicted as parallel or perpendicular to one other, it is to be understood that this is simply exemplary and need not be the case.

Figure 6:
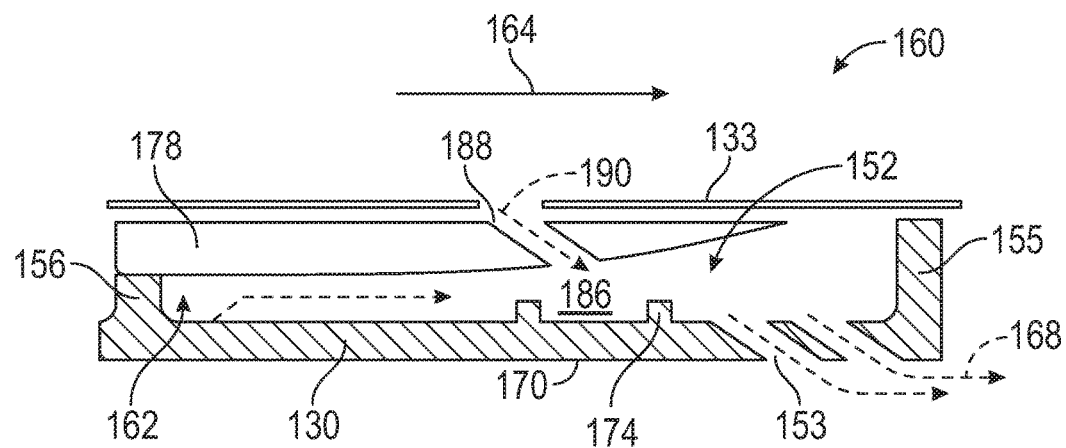
FIG. 6 is a sectional view of a second flow path of a U-shaped channel constructed in accordance with the second embodiment of the present disclosure depicting trip strips and a divergent channel.

In so doing, each U-shaped channel 154 has an upstream or first flow path 160, extending in a first direction 161 from the impingement hole 148 to a U-turn region 162, and a downstream or second flow path 163, extending in a second direction 164, different from the first direction 161, from the U-turn region 162 to the effusion holes 153. Cooling air 142 is communicated through the impingement hole 148, along the first flow path 160, through the gap 159, along the second flow path 163, and out through the effusion hole 153. The effusion hole 153 communicates the cooling air 142 through the liner 130 from the second flow path 163 into the combustion chamber 119. As the cooling air 142 travels through the U-shaped channel 154, it cools the liner 130 by convection. Once the cooling air 142 exits the effusion hole 153, the cooling air 142 may also spread out to form a cooling film 168 over a hot surface 170 of the liner 130, as shown in FIG. 6 and thereby reduce the temperature of the hot surface 170. The cooling film 168 may then exit the combustion chamber 119 as exhaust 136.

In prior art designs, cooling films may have reached a fuel-rich zone 172, as shown in FIG. 3, in the combustion chamber 119 and caused the combustion process to trend towards stoichiometric conditions. This is undesirable, though, since as the combustion process reaches stoichiometric conditions the temperature inside the combustion chamber 119 rises and causes NOx production to rise. Here, however, the present disclosure greatly improves on the prior art. More specifically, to reduce the effect of the cooling film 168 on the combustion process, the cooling flow needs to be reduced. This may be achieved by reducing the number of effusion holes 153 in the combustor liner 130, but this reduction in effusion holes 153 may reduce the cooling capability of the combustor 116.

To balance these two objectives of increasing the cooling capability of a combustor 116, while at the same time decreasing the number of effusion holes 153, a pressure drop between the impingement holes 148 and the effusion holes 153 may be adjusted. For example, by reducing the number of effusion holes 153, the impingement to effusion pressure drop split may become 50% to 50%, rather than the prior art pressure drop split of 80% to 20%. At a 50:50 pressure drop split, the number of impingement holes 148 may be substantially equal to the number of effusion holes 153, but this equal ratio of impingement holes 148 to effusion holes 153 is only one example and the present disclosure should not be restricted to only this embodiment as any desired ratio of impingement holes 148 to effusion holes 153 is possible.

Figure 5:
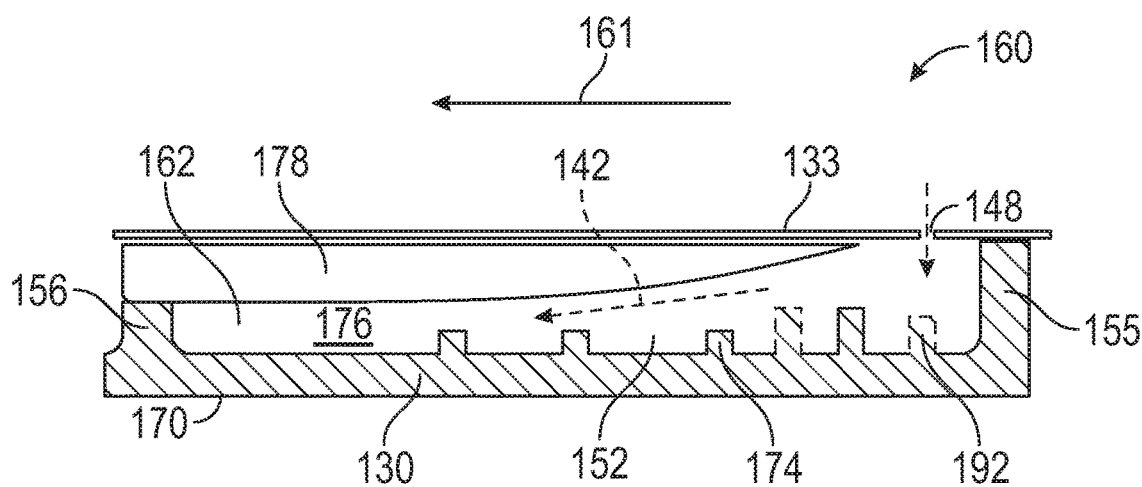
FIG. 5 is a sectional view of a first flow path of a U-shaped channel constructed in accordance with a second embodiment of the present disclosure depicting trip strips, pedestals, and an accelerating channel.

The increased pressure drop available also allows for new cooling features in the U-shaped channel 154 such as an accelerating channel 176, as shown in FIG. 5. The accelerating channel 176 may be formed in the first flow path 160 of the U-shaped channel 154 by a tapered panel 178 that is thicker proximate the U-turn region 162 than at the impingement hole 148. The tapered panel 178 may be unitary with the shell 133, or mounted to the shell 133. In so doing, the accelerating channel 176 narrows as the cooling air 142 approaches the U-turn region 162. This accelerating channel 176 increases the speed of the cooling air 142 as the cooling air 142 passes through the channel 176 by reducing a cross-sectional area of the first flow path 160 from the impingement hole 148 to the U-turn region 162. While a tapered panel 178 has been presented for forming the accelerating channel 176, other structures are also possible such as, but not limited to, decreasing a distance between the shell 133 and liner 130 of the combustor 116 along the first flow path 160 from the impingement hole 148 to the U-turn region 162.

In one embodiment, the accelerating channel 176 of the U-shaped channel 154 may narrow in cross-sectional area from the impingement holes 148 to the U-turn region 162 by a ratio of three to one, although other ratios are possible. This exemplary ratio may force the speed of the cooling air 142 to increase to a subsonic Mach of about 0.5 Mach or higher. The speed of the cooling air 142 may also be increased beyond 0.5 Mach up to sonic speed, or to any desired speed by further modifying the accelerating channel 176.

As shown in in FIG. 6, a divergent channel 186 may also be formed in the second flow path 163. This may be done by orienting another tapered panel 178 therein such that the tapered panel 178 is thicker proximate the U-turn region 162 than at the effusion hole 153. As stated previously, this tapered panel 178 may be mounted to or be unitary with the shell 133 of the combustor 116. The cooling air 142 flows from the U-turn region 162 into the divergent channel 186 and is calmed and/or slowed as the air 142 travels through the divergent channel 186 from the U-turn region 162 to the effusion hole 153. This calming and/or slowing of the cooling air 142 is accomplished by increasing a cross-sectional area of the second flow path 163 from the U-turn region 162 to the effusion hole 153. Again, while a tapered panel 178 has been presented for forming the divergent channel 186, other structures are also possible such as, but not limited to, increasing a distance between the shell 133 and liner 130 of the combustor 116 along the second flow path 163 from the U-turn region 162 to the effusion hole 153.

In one embodiment, as shown in FIG. 6, another feature of the present disclosure may be the provision of one of more refresher holes 188 communicating air through the shell 133 of the combustor 116. When a tapered panel 178 is used to form the divergent channel 186, the refresher holes 188 also communicate air through the tapered panel 178. The refresher holes 188 allow cooling air 142 from outside the combustor 116 to flow directly into the second flow path 163 as a refreshing flow 190. This refreshing flow 190 cools the cooling air 142 which has already traveled through the U-shaped channel 154.

Figure 7:
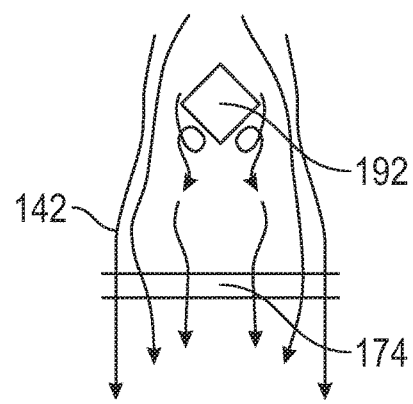
FIG. 7 is a plan view of a diamond shaped pedestal constructed in accordance with the present disclosure.

Referring again to FIG. 5, the liner 130 may also have a plurality of pedestals 192 or other protuberances extending therefrom. The pedestals 192 may be disposed on the liner 130 in the first flow path 160 such that the cooling air 144 entering into the U-shaped channel 154 through the impingement holes 148 impinges upon the pedestals 192 before flowing through the U-shaped channel 154. The pedestals 192 may be used to compensate and overcome the heat transfer debit associated with the loss of pressure potential relative to the 80:20 pressure split designs. To accomplish this, the pedestals 192 increase the surface area of the liner 130, thereby allowing better heat transfer between the liner 130 and the cooling air 142. In one embodiment, the pedestals 192 have a diamond shaped cross-section, such as in FIG. 7, which increases the breakup of the cooling air 142 as the cooling air 142 moves over the pedestals 192 towards the trip strips 174. Other shapes increasing the surface area of the liner 130 are certainly possible.

Further, as is illustrated by the embodiment of the first flow path 160 in FIG. 5, one or more trip strips 174 may be disposed on the liner 130 and be oriented at an angle to a flow direction of the cooling air 142. Such trip strips 174 may be provided, for example, in a chevron pattern with a point directed towards the incoming flow of the cooling air 142 as shown in FIG. 8, but any orientation of the trip strip 174 is possible. In the U-turn region 162, the trip strips 174 may be oriented normal to the flow of the cooling air as illustrated in FIG. 8, however, any orientation of the trip strips 174 in the U-turn region 162 is also possible. The trip strips 174 increase turbulence in the U-shaped channel 154 which forces the cooling air 142 to interact with a cold surface of the liner 130 more significantly. The increased turbulence in the cooling air 142 increases the cooling capabilities of the combustor 116.

As shown in FIG. 8, a curved fin 194 may also be disposed on the liner 130 in the first flow path 160 of the U-shaped channel 154. The curved fin 194 directs cooling air 142 along the first flow path 160 towards the U-turn region 162 after the cooling air 142 flows through the impingement hole 148 into the U-shaped channel 154.

While the foregoing features can be combined in various ways, one exemplary U-shaped channel 154 according to the present disclosure may include all such features including one or more impingement holes 148, one or more effusion holes 153, one or more trip strips 174, one or more pedestals 192, and one or more curved fins 194. The U-shaped channel 154 may also include the tapered panels 178 defining the accelerating channel 176 and the divergent channel 186 in the first flow path 160 and the second flow path 163 of the U-shaped channel 154, respectively.

Figure 9:
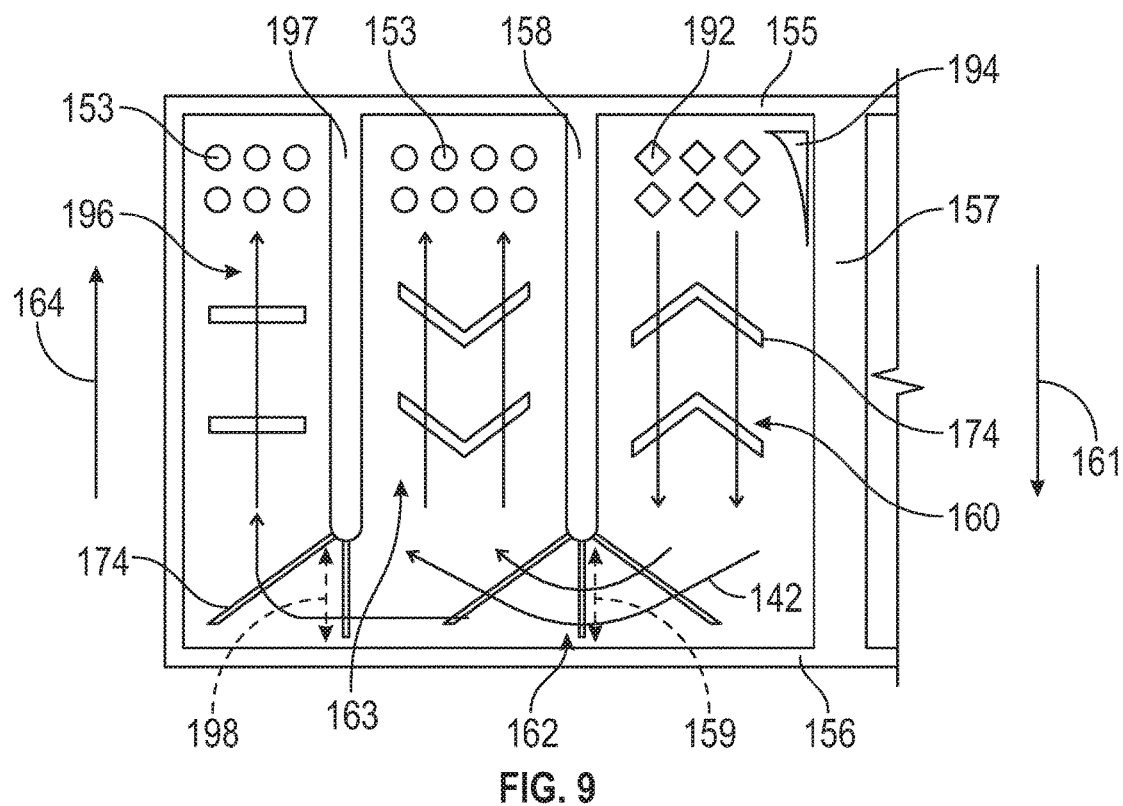
FIG. 9 is a plan view of a liner of a combustor constructed in accordance with a fourth embodiment of the present disclosure depicting a dual divergent channel design.

As best shown in FIG. 9, the U-shaped channel 154 may alternatively have a third flow path 196, similar to the second flow path 163 and extending in the second direction 151 from the U-turn region 162 to the effusion hole 153. In such an embodiment, the first and second flow paths 160, 163 are constructed as described above. The third flow path is then separated from the first flow path 160 by the second flow path 163. Another wall 197 of the liner 130 separates the second and third flow paths 163, 196 and defines another gap 198 between the second partition 156 and the wall 197. Some cooling air from the U-turn region 162 enters the third flow path 196 rather than the second flow path 163 via the gap 198. The third flow path 196 may also have trip strips 174 similar to the second flow path 163 or oriented normal to the flow of the cooling air 142, however, any orientation of the trip strips 174 is possible. A divergent channel 186 may also be formed in the third flow path 196 in the same manner as in the second flow path 163, such as with a tapered panel 178.

Figure 10:
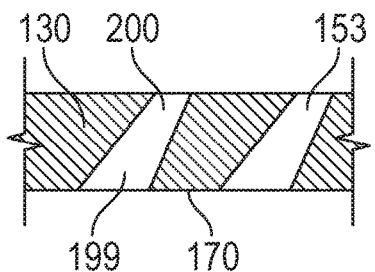
FIG. 10 is a sectional view of a plurality of frusto-conically shaped effusion holes in accordance with the present disclosure.

FIG. 10 depicts effusion holes 153 that have been machined or fabricated into a conical or frusto-conical shape. The effusion holes 153 may be so formed by laser-drilling or the like. The effusion hole 153 may be formed such that a broad end 199 of the effusion hole 153 may be positioned in the liner 130 such that it faces toward the combustor 116, and a narrow end 200 of the effusion holes 153 may be positioned in the liner 130 such that it faces away from the combustor 116. The conical or frusto-conical shape of the effusion holes 153 minimizes blow-off of the cooling film 168 on the hot surface 170 of the liner 130. The cooling air 142 exiting the conically or frusto-conically shaped effusion holes 153 therefore spreads out to cover more of the hot surface 170 of the liner 130, thereby protecting more of the liner 130 from the hot temperatures of the combustion chamber 119.

INDUSTRIAL APPLICABILITY

From the foregoing, it can be seen that the technology disclosed herein has industrial applicability in a variety of settings such as, but not limited to cooling combustors of gas turbine engines, as well as reducing emission concentrations in the exhaust of gas turbine engines. The gas turbine engine may be used in conjunction with an aircraft for generating thrust, or for land-based applications for generating power. Using the teachings of the present disclosure, a liner of a combustor may be constructed to decrease cooling flow into the combustion chamber while maintaining adequate cooling of the liner. This improvement over the prior art may prevent cooling air from interacting with the fuel-rich zone of the combustion chamber during operation, and thus may reduce the overall temperature of the combustion chamber as well as reducing NOx production. This design may further dilute and cool the exhaust of the combustion chamber more than prior art.

While the present disclosure has been in reference to a gas turbine engine and an aircraft, one skilled in the art will understand that the teachings herein can be used in other applications as well. It is therefore intended that the scope of the invention not be limited by the embodiments presented herein as the best mode for carrying out the invention, but that the invention will include all equivalents falling within the spirit and scope of the claims as well.

What is claimed is:

1. A method of cooling a combustor, comprising:
   directing cooling air through an impingement hole in a shell of the combustor and into a U-shaped channel formed between the shell and a liner of the combustor, the U-shaped channel having a first flow path and a second flow path;
   turning the cooling air in a U-turn from the first flow path to the second flow path;
   passing the cooling air from the second flow path through an effusion hole in the liner;

creating a cooling film on the liner with the cooling air passing through the effusion hole; and accelerating the cooling air in the first flow path with an acceleration channel, and calming the cooling air in the second flow path with a divergent channel.

2. The method of claim 1, further comprising increasing turbulence in the U-shaped channel by passing the cooling air over a trip strip disposed on the liner.

3. The method of claim 1, further comprising admitting additional cooling air into the second flow path through a refresher hole communicating through at least the shell.

4. A combustor, comprising:
a shell having an impingement hole;
a liner spaced from the shell and having an effusion hole;
a first partition spanning between the shell and the liner;
a second partition spaced from the first partition, and spanning between the shell and the liner;
a wall projecting from the first partition, spaced from the second partition and spanning between the shell and the liner; and
a U-shaped channel defined between the shell and the liner and defined in part by the wall, the U-shaped channel having an upstream end and a downstream end both adjacent the first partition and separated by the wall, wherein the upstream end and the downstream end are relative to a flow through the U-shaped channel, such that the upstream end is an end where a cooling flow enters the U-shaped channel and the downstream end is an end where the cooling flow exits the U-shaped channel; and
wherein the impingement hole communicates with the upstream end and the effusion hole communicates with the downstream end,
wherein the U-shaped channel includes a first flow path extending in a first direction from the impingement hole to a U-turn region, and a second flow path extending in a second direction from the U-turn region to the effusion hole,
wherein a cross-sectional area of the first flow path decreases from the impingement hole to the U-turn region, and a cross-sectional area of the second flow path increases from the U-turn region to the effusion hole.

5. The combustor of claim 4, further including a third partition spanning between the shell and the liner and connecting the first and second partitions.

6. The combustor of claim 4, wherein a refresher hole communicates through at least the shell and into the second flow path.

7. The combustor of claim 4, further comprising a chevron-shaped trip strip disposed on the liner.

8. The combustor of claim 4, further comprising a sloped fin disposed on the liner.

9. The combustor of claim 4, wherein the effusion hole is frusto-conical in shape.

10. The combustor of claim 4, further comprising a pedestal disposed on the liner.

11. The combustor of claim 4, wherein the U-shaped channel has a third flow path extending from the U-turn region in a direction parallel to the second flow path to a second effusion hole that is different from the effusion hole of the second flow path.

12. A gas turbine engine, comprising:
a compressor;
a combustor downstream from the compressor, the combustor including a shell having an impingement hole;
a liner disposed inside the shell and having an effusion hole, a first partition spanning between the shell and the liner;
a second partition spaced from the first partition and spanning between the shell and the liner;
a wall projecting from the first partition, spaced from the second partition and spanning between the shell and the liner; and
a U-shaped channel defined between the shell and the liner and defined in part by the wall, the U-shaped channel having an upstream end and a downstream end both adjacent the first partition and separated by the wall, wherein the upstream end and the downstream end are relative to a flow through the U-shaped channel, such that the upstream end is an end where a cooling flow enters the U-shaped channel and the downstream end is an end where the cooling flow exits the U-shaped channel; and
wherein the impingement hole communicates with the upstream end and the effusion hole communicates with the downstream end; and
a turbine downstream from the combustor and connected to the compressor by a rotating shaft;
the combustor further includes a first flow path extending in a first direction from the impingement hole to a U-turn region, and a second flow path extending in a second direction, different from the first direction, from the U-turn region to the effusion hole,
wherein a cross-sectional area of the first flow path decreases from the impingement hole to the U-turn region and a cross-sectional area of the second flow path increases from the U-turn region to the effusion hole.

13. The gas turbine engine of claim 12, wherein the combustor further comprises a third partition spanning between the liner and the shell and connecting the first and second partitions.

14. The gas turbine engine of claim 12, wherein a refresher hole communicates through at least the shell to the second flow path of the U-shaped channel.

15. The gas turbine engine of claim 12, further comprising a sloped fin disposed on the liner.

* * * * *